(12) United States Patent
Ishida et al.

(10) Patent No.: US 11,117,561 B2
(45) Date of Patent: Sep. 14, 2021

(54) SENSOR MONITORING DEVICE AND BRAKING CONTROL DEVICE FOR VEHICLE PROVIDED WITH SENSOR MONITORING DEVICE

(71) Applicant: ADVICS CO., LTD., Kariya (JP)

(72) Inventors: Yasuhito Ishida, Toyokawa (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 294 days.

(21) Appl. No.: 16/318,816

(22) PCT Filed: Jul. 26, 2017

(86) PCT No.: PCT/JP2017/027107
§ 371 (c)(1),
(2) Date: Jan. 18, 2019

(87) PCT Pub. No.: WO2018/021436
PCT Pub. Date: Feb. 1, 2018

(65) Prior Publication Data
US 2019/0184953 A1 Jun. 20, 2019

(30) Foreign Application Priority Data

Jul. 27, 2016 (JP) .............................. JP2016-147006

(51) Int. Cl.
*B60T 8/88* (2006.01)
*G08C 19/00* (2006.01)
(Continued)

(52) U.S. Cl.
CPC .............. *B60T 8/885* (2013.01); *B60T 7/042* (2013.01); *B60T 8/17* (2013.01); *B60T 8/171* (2013.01);
(Continued)

(58) Field of Classification Search
CPC . B60T 8/885; B60T 7/042; B60T 8/17; B60T 8/171; B60T 8/326; B60T 8/88;
(Continued)

(56) References Cited

U.S. PATENT DOCUMENTS 4,047,149 A * 9/1977 Akita ...................... B60T 17/22
340/453
5,015,043 A * 5/1991 Resch ................... B60T 8/4275
180/197
(Continued)

FOREIGN PATENT DOCUMENTS

JP 2001522331 A 11/2001
JP 2010167970 A 8/2010
(Continued)

OTHER PUBLICATIONS

Nakaoka, Hiroshi; English Translation of WO2014184840A1 ("Brake device"); EPO (Year: 2014).*

(Continued)

*Primary Examiner* — Yazan A Soofi
*Assistant Examiner* — Naeem Taslim Alam
(74) *Attorney, Agent, or Firm* — Buchanan Ingersoll & Rooney PC

(57) ABSTRACT

A sensor monitoring device that comprises: a first controller ECA into which a detected value Smn from a sensor SMN is inputted via a first signal line LMA; a second controller ECB into which the detected value Smn is inputted via a second signal line LMB; and a communication bus CMB that transmits signals between the first controller ECA and the second controller ECB. The second controller ECB reads in the detected value Smn as a second processing value Smb and transmits the second processing value Smb to the first controller ECA via the communication bus CMB. The first controller ECA reads in the detected value Smn as a first (Continued)

processing value Sma, receives the second processing value Smb, and, on the basis of the first processing value Sma and the second processing value Smb, determines the suitability of the first processing value Sma.

4 Claims, 7 Drawing Sheets

(51) Int. Cl.
  *B60T 17/22* (2006.01)
  *B60T 7/04* (2006.01)
  *G08C 25/00* (2006.01)
  *B60T 8/17* (2006.01)
  *B60T 8/171* (2006.01)
  *B60T 8/32* (2006.01)
  *H04Q 9/00* (2006.01)

(52) U.S. Cl.
  CPC ............... *B60T 8/326* (2013.01); *B60T 8/88* (2013.01); *B60T 17/22* (2013.01); *B60T 17/221* (2013.01); *G08C 19/00* (2013.01); *G08C 25/00* (2013.01); *H04Q 9/00* (2013.01); *B60T 8/3255* (2013.01); *B60T 2220/04* (2013.01); *B60T 2270/413* (2013.01)

(58) Field of Classification Search
  CPC ...... B60T 17/22; B60T 17/221; B60T 8/3255; B60T 2220/04; B60T 2270/413; G08C 19/00; G08C 25/00; H04Q 9/00
  See application file for complete search history.

(56) References Cited

U.S. PATENT DOCUMENTS

| | | | | |
|---|---|---|---|---|
| 6,410,993 | B1 | 6/2002 | Giers | |
| 7,359,786 | B2 * | 4/2008 | Lindqvist | B60T 8/1708 |
| | | | | 303/122 |
| 10,422,658 | B2 * | 9/2019 | Steinhardt | G01C 25/005 |
| 2005/0288843 | A1 * | 12/2005 | Lindqvist | B60T 8/1708 |
| | | | | 701/70 |
| 2009/0236903 | A1 * | 9/2009 | Nishino | B60T 8/4872 |
| | | | | 303/3 |
| 2011/0040465 | A1 * | 2/2011 | Suda | B60T 8/3275 |
| | | | | 701/70 |
| 2015/0344012 | A1 * | 12/2015 | Knechtges | B60T 7/042 |
| | | | | 701/70 |
| 2016/0082937 | A1 * | 3/2016 | Nakaoka | B60T 7/042 |
| | | | | 303/15 |
| 2016/0214582 | A1 * | 7/2016 | Brenn | B60T 7/042 |
| 2016/0325719 | A1 * | 11/2016 | Linhoff | B60T 8/92 |
| 2017/0297546 | A1 * | 10/2017 | Takeda | B60T 13/662 |

FOREIGN PATENT DOCUMENTS

| | | | |
|---|---|---|---|
| JP | 2014097687 A | 5/2014 | |
| JP | 2015-081013 A | 4/2015 | |
| WO | WO-2014184840 A1 * | 11/2014 | ............. B60T 8/321 |

OTHER PUBLICATIONS

U.S. Appl. No. 16/320,861, filed Jan. 25, 2019, Yasuhito Ishida.
International Search Report (PCT/ISA/210) dated Oct. 31, 2017, by the Japanese Patent Office as the International Searching Authority for International Application No. PCT/JP2017/027111.

\* cited by examiner

SENSOR MONITORING DEVICE AND BRAKING CONTROL DEVICE FOR VEHICLE PROVIDED WITH SENSOR MONITORING DEVICE

TECHNICAL FIELD

The present invention relates to a sensor monitoring device and a braking control device of a vehicle provided with the sensor monitoring device.

BACKGROUND ART

Patent Literature 1 describes, in an aim of "appropriately determining abnormality in an output of a stroke sensor by comparing two output values of the stroke sensor" that "a first abnormality determination unit 90 determines that the output of a first stroke sensor 46a or a second stroke sensor 46b is abnormal if a sum of a first output value and second output value is outside a predetermined range. A second abnormality determination unit 92 determines that the output of the first stroke sensor 46a or the second stroke sensor 46b is abnormal if a sum of the first output value and the second output value is determined as within the predetermined range by the first abnormality determination unit 90, an absolute value of a difference between the first output value and the second output value is smaller than or equal to a predetermined threshold value and a master output value is smaller than a predetermined pressure value".

Patent Literature 2 describes, in an aim of "suppressing supply of fluid pressure to a wheel cylinder with both a fluid pressure control mechanism and a booster mechanism", that "a first ECU 26 controls an electric actuator 20 of an electric booster device 16. A second ECU 33 controls the operation of an ESC 31 which is a fluid pressure control device. The second ECU 33 operates the ESC 31 to perform a backup control of supplying a brake fluid to wheel cylinders 3L, 3R, 4L, 4R when determined that the first ECU 26 has failed. On the other hand, the first ECU 26 does not control the electric actuator 20 when the second ECU 33 performs the backup control".

In order to improve the reliability of the control device, Patent Literature 1 describes including a plurality of sensors (first and second stroke sensors). In addition, Patent Literature 2 describes that two fluid pressure control devices are provided, where when one of the devices malfunctions, backup is performed by the other device. In the configuration with the plurality of control devices described in Patent Literature 2, a large number of sensors are required to improve the reliability. For this reason, it is desired to have a simple configuration and ensure the reliability of the entire device.

CITATIONS LIST

Patent Literature

Patent Literature 1: Japanese Laid-Open Patent Application Publication No. 2010-167970
Patent Literature 2: Japanese Laid-Open Patent Application Publication No. 2014-097687

SUMMARY OF INVENTION

Technical Problems

An object of the present invention is to provide a sensor monitoring device in which the number of sensors is reduced and reliability can be secured in a device including a plurality of control devices. In addition, it is an object to apply the sensor monitoring device to a braking control device of a vehicle, and to provide a simple structure.

Solutions to Problems

A sensor monitoring device according to the present invention includes a first controller (ECA) to which a detected value (Smn) from the sensor (SMN) is input via a first signal line (LMA); a second controller (ECB) to which the detected value (Smn) is input via a second signal line (LMB); and a communication bus (CMB) that transmits signals between the first controller (ECA) and the second controller (ECB).

In the sensor monitoring device according to the present invention, the second controller (ECB) reads the detected value (Smn) as a second processing value (Smb), and transmits the second processing value (Smb) to the first controller (ECA) via the communication bus (CMB). Then, the first controller (ECA) reads the detected value (Smn) as a first processing value (Sma) and receives the second processing value (Smb), and determines suitability of the first processing value (Sma) on the basis of the first processing value (Sma) and the second processing value (Smb).

In the sensor monitoring device according to the present invention, the first controller (ECA) determines that the first processing value (Sma) is in a suitable state when the first processing value (Sma) and the second processing value (Smb) match; and determines that the first processing value (Sma) is in a non-suitable state when the first processing value (Sma) and the second processing value (Smb) do not match.

According to the above configuration, the detected value Smn of one sensor SMN is read into the first and second controllers ECA and ECB without providing two sensors SMN of the same type. Then, the first controller ECA acquires the detected value Smn by the ECA itself and the communication bus CMB, and the suitability of the sensor detected value (read value) Sma is determined by the comparison thereof. The reliability of the sensor monitoring device SKS can be secured with a simple configuration by the mutual monitoring of the sensor detected values.

In the sensor monitoring device according to the present invention, the first controller (ECA) compensates for a time delay of the signal transmission and determines suitability of the first processing value (Sma). Furthermore, in the sensor monitoring device according to the present invention, the first controller (ECA) stores the first processing value (Sma) and the second processing value (Smb) over at least one or more calculation cycles, and compensates for the time delay of the signal transmission based on the stored first processing value (Smak) and the stored second processing value (Smbk). Furthermore, in the sensor monitoring device according to the present invention, one of the first controller (ECA) and the second controller (ECB) transmits a synchronization signal (Cnt), and the second controller (ECB) transmits the second processing value (Smb) based on the synchronization signal (Cnt).

According to the above configuration, the signal transmission delay of the communication bus CMB between the two controllers ECA and ECB is compensated, and highly accurate determination can be performed.

A brake control device for a vehicle according to the present invention regulates a brake fluid pressure (Pwc) of a wheel cylinder (WC) according to an operation of a braking operation member (BP) of the vehicle to produce a brake force at a wheel (WH). The braking control device for the vehicle includes "an operational displacement sensor (SBP) that detects an operational displacement (Sbp) of the braking operation member (BP)"; "a first fluid pressure unit (EAA) that reads the operational displacement (Sbp) as a first displacement processing value (Sba) via a first displacement signal line (LMA) and regulates the brake fluid pressure (Pwc) based on the first displacement processing value (Sba)"; "a second fluid pressure unit (EAB) that reads the operational displacement (Sbp) as a second displacement processing value (Sbb) via a second displacement signal line (LMB) and regulates the brake fluid pressure (Pwc) based on the second displacement processing value (Sbb)"; "a communication bus (CMB) that transmits signals between the first fluid pressure unit (EAA) and the second fluid pressure unit (EAB)"; and "a determining means (HNA,HNB) that determines suitability of the first displacement processing value (Sba) based on the first displacement processing value (Sba) and the second displacement processing value (Sbb).

In the brake control device for the vehicle according to the present invention, the first fluid pressure unit (EAA) regulates the brake fluid pressure (Pwc) based on the first displacement processing value (Sba) when the determining means (HNA, HNB) determines that the first displacement processing value (Sba) is in a suitable state, and regulates the brake fluid pressure (Pwc) based on the second displacement processing value (Sbb) when the determining means (HNA, HNB) determines that the first displacement processing value (Sba) is in a non-suitable state.

In a braking control device for a vehicle according to the present invention, the first fluid pressure unit (EAA) includes an operation force sensor (FBP) that detects an operation force (Fbp) of the braking operation member (BP), reads the operation force (Fbp) as a first force processing value (Fba), regulates the brake fluid pressure (Pwc) based on the first displacement processing value (Sba) and the first force processing value (Fba) when the determining means (HNA, HNB) determines that the first displacement processing value (Sba) is in a suitable state, and regulates the brake fluid pressure (Pwc) based only on the first force processing value (Fba) when the determining means (HNA, HNB) determines that the first displacement processing value (Sba) is in a non-suitable state.

According to the above configuration, since the signal (operational displacement) Bbp of the operational displacement sensor SBP is mutually monitored by the first and second controllers ECA and ECB, redundancy of the device operation can be secured with a simplified device configuration.

DESCRIPTION OF EMBODIMENTS

Figure 1:
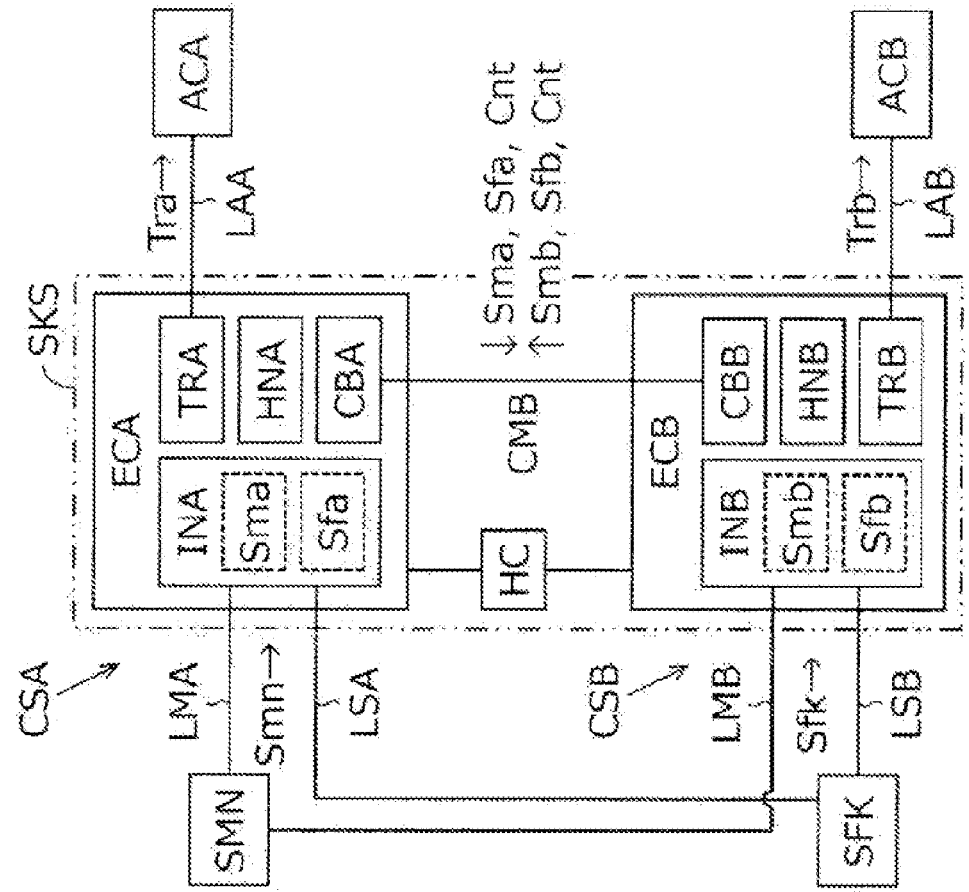
FIG. 1 is an overall configuration diagram of a sensor monitoring device according to the present invention.

Overall Configuration of Sensor Monitoring Device According to the Present Invention A sensor monitoring device SKS according to the present invention will be described with reference to an overall configuration diagram of FIG. 1. In the following description, constituent members denoted by the same symbols, calculation process, signals, characteristics, and values are of the same function. Therefore, redundant explanation may be omitted.

The sensor monitoring device SKS according to the present invention is configured between two control devices CSA and CSB. The first and second control devices CSA, CSB are configured by a main sensor SMN, a sub-sensor SFK, first and second controllers ECA, ECB, first and second actuators ACA, ACB and a notifying device HC shared by the first and second control devices CSA, CSB.

First, the first control device CSA will be described. The first control device CSA is configured by the main sensor SMN, the sub-sensor SFK, the first controller ECA, the first actuator ACA, and the notifying device HC.

A main detected value Smn is detected by the main sensor SMN. Furthermore, a sub-detected value Sfk, which is a physical quantity different from the main detected value Smn, is detected by the sub-sensor SFK. For example, a state quantity related to "displacement" is detected as the main detected value Smn, and a state quantity related to "force" is detected as the sub-detected value Sfk. The main detected value Smn and the sub-detected value Sfk are related to each other in a predetermined relationship. For example, the predetermined relationship is "relationship between displacement and force (spring constant, longitudinal elastic modulus)" in the case of assuming an elastic body.

The first controller ECA is an electronic control unit, and controls the first actuator ACA based on the main detected value Smn or the like. The main sensor SMN and the first controller ECA are electrically connected by a first main signal line LMA to obtain the main detected value Smn. The first main signal line LMA is a cable (collective term of insulator, electric wire covered with protective coating, and optical fiber). When the main sensor SMN is incorporated in the first controller ECA, a pin (sensor pin) can be adopted as the first main signal line LMA. For example, in the first main signal line LMA, only the main detected value Smn is transmitted, and other signals are not transmitted.

Similarly, the sub-sensor SFK and the first controller ECA are electrically connected by a first sub-signal line LSA to acquire the sub-detected value Sfk. A cable or a sensor pin (configuration in which sub-sensor SFK is incorporated in the first control device CSA) is adopted as the first sub-signal line LSA. For example, in the first sub-signal line LSA, only the sub-detected value Sfk is transmitted, and other signals are not transmitted.

The first controller ECA includes a first input unit INA, a first communication unit CBA, a first determination unit HNA, and a first target calculating unit TRA. The first input unit INA is an input interface with the main sensor SMN and the sub-sensor SFK. When the main sensor SMN and the sub-sensor and SFK are analog type sensors, analog-digital conversion is performed at the first input unit INA. In the first input unit INA, the main detected value Smn and the sub-detected value Sfk are read as a first main processing value Sma and a first sub-processing value Sfa (referred to as "input process").

In the first communication unit CBA, communication is performed with the second controller ECB (in particular, second communication unit CBB) via the communication bus CMB. Specifically, in the first communication unit CBA, process for serial communication is performed. The communication bus CMB is a communication bus that connects the first communication unit CBA of the first controller ECA and the second communication unit CBB of the second controller ECB. A serial communication bus may be adopted as the communication bus CMB. In the serial communication bus CMB, data is transmitted serially one bit at a time in one communication path. For example, controller area network (CAN) may be adopted as the serial communication bus CMB.

The first main processing value Sma, the first sub-processing value Sfa, the second main processing value Smb, and the second sub-processing value Sfb are mutually communicated between the first and second controllers ECA and ECB via the communication bus CMB. Furthermore, in order to ensure synchronization of communication signals between the first controller ECA and the second controller ECB, a synchronization signal Cnt is communicated. The first main processing value Sma, the first sub-processing value Sfa, and the synchronization signal Cnt are transmitted from the first communication unit CBA to the second communication unit CBB. Conversely, the second main processing value Smb, the second sub-processing value Sfb, and the synchronous signal Cnt are transmitted from the second communication unit CBB to the first communication unit CBA. In the first controller ECA, the main detected value Smn and the sub-detected value Sfk are read by the first input unit INA as the first main processing value Sma and the first sub-processing value Sfa, and read by the first communication unit CBA as the second main processing value Smb and the second sub-processing value Sfb.

The first determination unit HNA determines whether or not the first main processing value Sma acquired by the first input unit INA is appropriate (suitability determination process). In the first determination unit HNA, the suitability of the first main processing value Sma is determined based on the first main processing value Sma itself. For example, when the first main signal line LMA is disconnected, the first main processing value Sma acquired via the first input unit INA is read as "a value that is impossible in reality". Therefore, disconnection of the first main signal line LMA etc. is identified, and a non-suitable state of the first main processing value Sma is determined (disconnection determination).

Furthermore, the first main processing value Sma is compared with the second main processing value Smb transmitted via the communication bus CMB, and the suitability of the first main processing value Sma is determined. Specifically, the suitable state of the first main processing value Sma is determined when the first main processing value Sma and the second main processing value Smb match, and a non-suitable state is determined when the processing values do not match (referred to as "comparative determination"). The suitability of the second main processing value Smb is determined by the second controller ECB, and the suitable state of the second main processing value Smb is determined.

Furthermore, the suitability of the first main processing value Sma is determined based on the first main processing value Sma, the first sub-processing value Sfa acquired by the first input unit INA, and the predetermined relationship (spring constant or the like). Here, the predetermined relationship is a relationship (referred to as "conversion relationship") for mutually converting "the state quantity related to the first main processing value Sma" and "the state quantity related to the first sub-processing value Sfa", and is set in advance. According to the conversion relationship, the first sub-processing value Sfa is converted into the state quantity related to the first main processing value Sma, and the suitability of the first main processing value Sma can be determined by comparing the "value after the conversion (referred to as a conversion value)" with the first main processing value Sma (referred to as "conversion determination"). The suitable state of the first main processing value Sma is determined when the first sub-processing value Sfa after the conversion (conversion value Smh) and the first main processing value Sma match, and a non-suitable state is determined when the processing values do not match.

In the first determination unit HNA, the suitability determination of the first sub-processing value Sfa read by the first input unit INA is executed in the same manner as the first main processing value Sma. For example, the disconnection determination of the first sub-signal line LSA is adopted. In a state where the first sub-signal line LSA is disconnected, the first sub-processing value Sfa takes an unrealistic value, and thus the first sub-processing value Sfa can be determined as non-suitable (disconnection determination). Similarly, the above-described comparative determination and conversion determination can be executed for the first sub-processing value Sfa.

In the first determination unit HNA, the suitability determination of the operation status of the first controller ECA and the first actuator ACA is executed in addition to the suitability determination of the read value (i.e., the sensor value) at the first input unit INA. In the case where at least one of the main and sub-sensors SMN, SFK, the first controller ECA, and the first actuator ACA is determined to be malfunctioning by the first determination unit HNA, notification is made to the driver by the notifying device HC. For example, the notifying device HC notifies to the driver that the device is malfunctioning by voice, display, or the like.

In the first target calculating unit TRA, the first target value Tra for controlling the first actuator ACA is calculated based on the "first main processing value Sma and the first sub-processing value Sfa", at the time of suitable operation of the first control device CSA. When the non-suitable state of the first main processing value Sma is determined by the first determination unit HNA, the first target value Tra is calculated based on "only the first sub-processing value Sfa" by the first target calculating unit TRA. Furthermore, in the first target calculating unit TRA, the second main processing value Smb (read value of second controller ECB) is adopted in place of the first main processing value Sma, and the first target value Tra is calculated based on the "second main processing value Smb and first sub-processing value Sfa". That is, when the first main processing value Sma is non-suitable and the first sub-processing value Sfa is suitable, the first target value Tra is determined based on "the second main processing value Smb and the first sub-processing value Sfa", or "only the first sub-processing value Sfa". On the other hand, when the first main processing value Sma is suitable and the first sub-processing value Sfa is malfunctioning, the first target value Tra is determined based on "the first main processing value Sma and the second sub-processing value Sfb", or "only the first main processing value Sma".

The first actuator ACA is controlled based on the first target value Tra. As the first actuator ACA, one which controls the brake fluid pressure Pwc according to the driver's braking operation can be Adopted (details will be described later).

Each configuring element (ECB etc.) in the second control device CSB corresponds to each configuring element (ECA etc.) in the first control device CSA. Therefore, the second control device CSB will be briefly described. The second control device CSB is configured by the main sensor SMN, the sub-sensor SFK, the second controller ECB, the second actuator ACB, and the notifying device HC.

The main sensor SMN and the second controller ECB are connected by way of the second main signal line LMB. Furthermore, the sub-sensor SFK and the second controller ECB are connected by way of the second sub-signal line LSB. The main detected value Smn of the main sensor SMN and the sub-detected value Sfk of the sub-sensor SFK are read as the second main processing value Smb and the second sub-processing value Sfb at the second input unit INB of the second controller ECB. Furthermore, the first main processing value Sma (corresponds to second main processing value Smb) and the first sub-processing value Sfa (corresponds to second sub-processing value Sfb) are read by the second communication unit CBB of the second controller ECB via the communication bus CMB. Then, the "disconnection determination of the second main signal line LMB and the second sub-signal line LSB", the "comparative determination by the second main processing value Smb and the first main processing value Sma", and the "conversion determination by the second main processing value Smb and the second sub-processing value Sfb" are respectively executed in the second termination unit HNB to determine the suitability of the second main processing value Smb. The suitability of the second sub-processing value Sfb is also determined in the second determination unit HNB through a similar method.

A second target value Trb for controlling the second actuator ACB is calculated by the second target calculating unit TRB. The determination result of the second determination unit HNB is taken into consideration for the calculation of the second target value Trb. When both the second main processing value Smb and the second sub-processing value Sfb are suitable, the second target value Trb is calculated based on the "second main processing value Smb and the second sub-processing value Sfb". When the second main processing value Smb is non-suitable and the second sub-processing value Sfb is suitable, the second target value Trb is determined based on "the first main processing value Sma and the second sub-processing value Sfb" or "only the second sub-processing value Sfb". On the other hand, when the second main processing value Smb is suitable and the second sub-processing value Sfb is malfunctioning, the second target value Trb is calculated based on "the second main processing value Smb and the first sub-processing value Sfa "or "only the second main processing value Smb". Then, the second actuator ACB is controlled based on the second target value Trb.

The second control device CSB has been briefly described above. Since the first control device CSA and the second control device CSB correspond to each other, the description of the first control device CSA corresponds to the description of the second control device CSB with "first" replaced with "second", "LMA" replaced with "LMB", "LSA" replaced with "LSB", "ECA" replaced with "ECB", "INA" replaced with "INB", "CBA" replaced with "CBB", "HNA" replaced with "HNB", "TRA" replaced with "TRB" and "ACA" replaced with "ACB". Furthermore, the description of the first control device CSA corresponds to the description of the second control device CSB with "Sma" replaced with "Smb", "Sfa" replaced with "Sfb" and "Tra" replaced with "Trb".

One sensor SMN is connected to two controllers ECA and ECB through two signal lines LMA and LMB, respectively. In the first controller ECA, the main detected value Smn of the main sensor SMN is read as the first main processing value Sma. Further, in the second controller ECB, the main detected value Smn of the main sensor SMN is read as the second main processing value Smb. The first controller ECA and the second controller ECB are connected through the communication bus CMB and can communicate with each other. In the first controller ECA of the sensor monitoring device SKS, the first main processing value Sma read through the first main signal line LMA and the second main processing value Smb transmitted from the second controller ECB are compared. The suitability of the first main processing value Sma is determined by such comparison (referred to as "comparative determination"). For example, in the first controller ECA, determination is made that "the first main processing value Sma is in a suitable state" when the first main processing value Sma and the second main processing value Smb substantially match, and determination is made that "the first main processing value Sma is in a non-suitable state" when the first main processing value Sma and the second main processing value Smb do not match. Since the sensor monitoring device SKS is configured as described above, the reliability of the sensor monitoring device SKS can be secured by one sensor SMN without forming a redundant configuration including two similar types of sensors SMN.

Furthermore, in the sub-sensor SFK, a sub-detected value Sfk which is a physical quantity different from the main detected value Smn of the main sensor SMN is detected. Here, there is a known mutual relationship (e.g., a spring constant) as a physical quantity between the main detected value Smn and the sub-detected value Sfk. Therefore, the sub-detected value Sfk can be converted to the same physical quantity as the main detected value Smn based on the conversion characteristics set in advance. The sub-sensor SFK is connected to at least the first controller ECA. The sub-detected value Sfk of the sub-sensor SFK is read by the first controller ECA as the first sub-processing value Sfa and is converted into a value Smh of the same physical quantity as the main detected value Smn based on the conversion characteristics. Here, the value Smh after the conversion of the first sub-processing value Sfa is called a "conversion value".

The first controller ECA determines the suitability of the first main processing value Sma based on a comparison between the conversion value Smh and the first main processing value Sma. For example, in the sensor monitoring device SKS, determination is made that "the first main processing value Sma is in a suitable state" when the first main processing values Sma and the Smh substantially match, and determination is made that "the first main processing value Sma is in a non-suitable state" when the first main processing value Sma and the Smh do not math (referred to as "conversion determination"). As a result of this conversion determination, the reliability of the sensor monitoring device SKS can be improved with a simple configuration, similar to the description made above.

The conversion determination (determination based on conversion value Smh) can be adopted when the first main processing value Sma and the second main processing value Smb do not match. Which of the first main processing value Sma and the second main processing value Smb is in a non-suitable state can be determined by the determination based on the conversion value Smh.

In the configuration described above, the second controller ECB can be connected only to the main sensor SMN. In this case, the second force signal line LSB is omitted. Even in this configuration, the same effect as described above can be obtained.

The determination of the first main processing value Sma in the first controller ECA has been described above, but determination of the second main processing value Smb can be carried out in the second controller ECB through a similar method. That is, the suitability of at least one of the first controller ECA and the second controller ECB can be determined with respect to the signals Sma and Smb from the main sensor SMN. Furthermore, the suitability determination can be executed through a similar method in at least one of the first controller ECA and the second controller ECB with respect to the signals Sfa and Sfb from the sub-sensor SFK.

Processing by First and Second Controllers ECA, ECB

Figure 2:
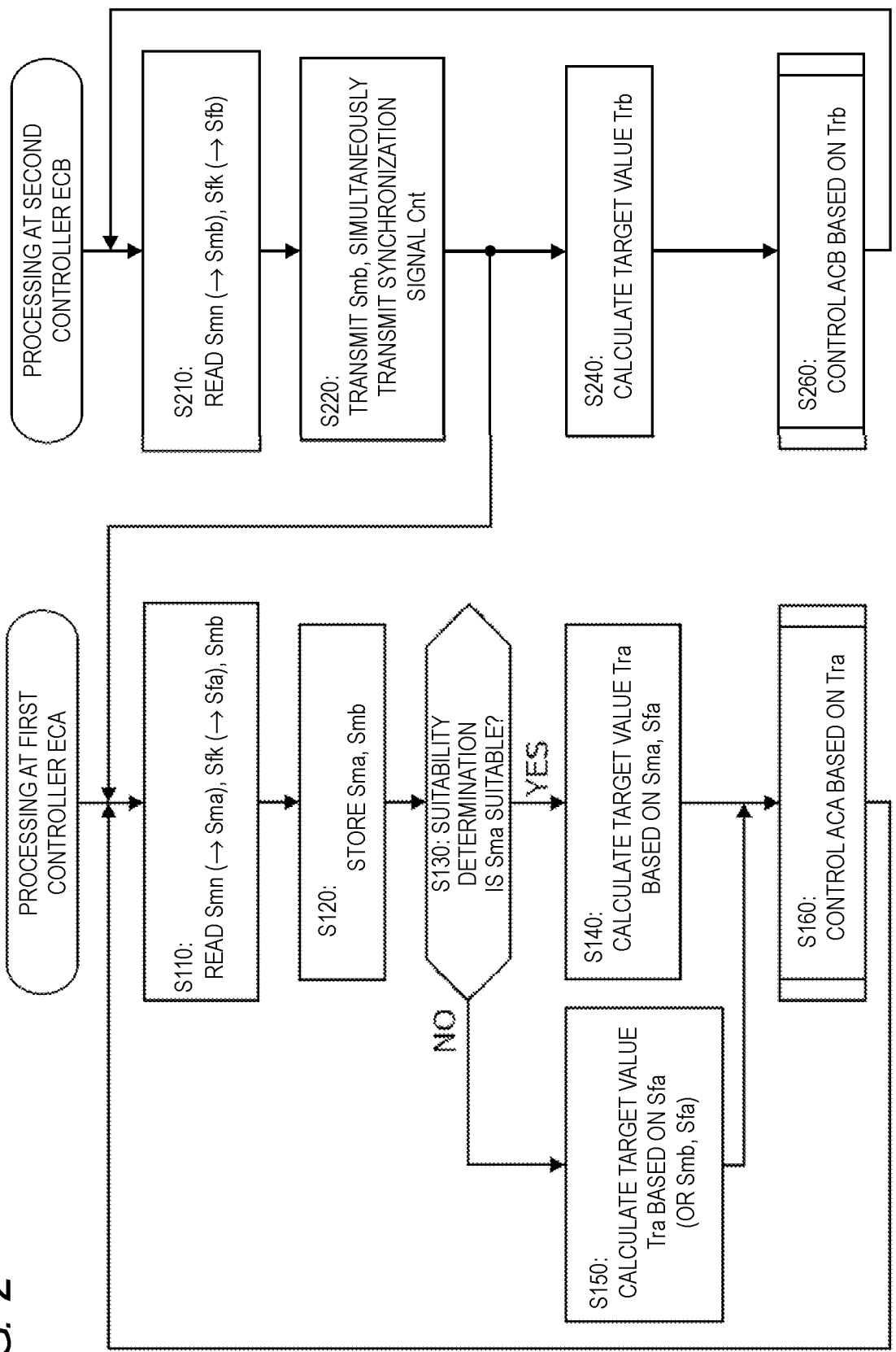
FIG. 2 is a flowchart describing processing in first and second controllers.

The processing in the first and second controllers ECA, ECB will be described using a configuration in which "the main and sub-sensors SMN, SFK are connected to the first controller ECA, only the main sensor SMN is connected to the second controller ECB, and the suitability of the first main processing value Sma is determined by the first controller ECA" by way of example, with reference to the flow chart of FIG. 2.

First, the processing in the first controller ECA will be described. In step S110, the main detected value Smn is read as the first main processing value Sma, and the sub-detected value Sfk is read as the first sub-processing value Sfa. Furthermore, the second main processing value Smb is acquired via the communication bus CMB and is read into the first controller ECA. In step S120, the first and second main processing values Sma and Smb are stored. Then, in step S130, "whether or not the first main processing value Sma is suitable" is determined. Details of the suitability determination of the first main processing value Sma will be described later.

When the first main processing value Sma is suitable and step S130 is affirmative ("YES"), the process proceeds to step S140. In step S140, the first target value Tra in the case where the first main processing value Sma is appropriate is calculated. In this case, the first target value Tra is calculated based on the two control variables Sma and Sfa.

On the other hand, when the first main processing value Sma is non-suitable and the result in step S130 is negative ("NO"), the process proceeds to step S150. In step S150, the first target value Tra in the case where the first main processing value Sma is non-suitable is calculated. For example, in step S150, the first main processing value Sma is not adopted for the calculation of the first target value Tra, and only for the first sub-processing value Sfa is adopted. That is, the first target value Tra is calculated based on "only the first sub-processing value Sfa". Alternatively, in step S150, the first target value Tra is calculated based on "the second main processing value Smb and the first sub-processing value Sfa". That is, the second main processing value Smb can be adopted for the calculation of the first target value Tra instead of the first main processing value Sma.

After the process of steps S140 and S150, the process proceeds to step S160. In step S160, the first actuator ACA is driven and controlled based on the first target value Tra.

Next, the processing in the second controller ECB will be described. In step S210, the main detected value Smn is read as the second main processing value Smb. In step S220, the second main processing value Smb is transmitted from the second controller ECB to the first controller ECA via the communication bus CMB. At this time, the synchronization signal Cnt can be transmitted at the same time. Here, the synchronization signal Cnt is a signal for compensating the phase difference of the calculation cycle between the first controller ECA and the second controller ECB and synchronizing the calculation cycle of each other. Although the synchronization signal Cnt is transmitted from the second controller ECB to the first controller ECA, it may be transmitted from the first controller ECA to the second controller ECB.

In step S240, the second target value Trb is calculated based on the second main processing value Smb. In step S260, the second actuator ACB is controlled based on the second target value Trb. The outline of the processing in the first and second controllers ECA and ECB has been described above.

<<Suitability determination Process of First Main Processing Value Sma>>

Next, the details of the suitability determination of the first main processing value Sma (process of step S130) will be described. In the suitability determination, the first main processing value Sma and the second main processing value Smb are first compared by comparative determination. When the first main processing value Sma and the second main processing value Smb substantially match, determination is made that both the first main processing value Sma and the second main processing value Smb are suitable.

On the other hand, when the first main processing value Sma and the second main processing value Smb do not match, the probability that either one of the first main processing value Sma or the second main processing value Smb is suitable, and the other is non-suitable is high. In this case, the first main processing value Sma has a possibility of being non-suitable. Therefore, in the process of step S150, the first main processing value Sma suspected is not adopted, and the first target value Tra is calculated based only on the first sub-processing value Sfa.

In step S130, the conversion value Smh is calculated based on the first sub-processing value Sfa and the conversion characteristic. Although the first main processing value Sma and the first sub-processing value Sfa are different physical quantities, there is a known relationship between these physical quantities. For this reason, the first sub-processing value Sfa is replaced with the conversion value Smh based on the conversion characteristics (conversion map CHfs to be described later) set in advance. When the first main processing value Sma and the second main processing value Smb do not match by the conversion determination, determination is made that one of the two state quantities that is closer to the conversion value Smh is suitable. That is, when the first main processing value Sma is more approximate to the conversion value Smh, determination is made that the first main processing value Sma is suitable. On the other hand, when the second main processing value Smb is more approximate to the conversion value Smh, determination is made that the first main processing value Sma is non-suitable. When determined by the conversion determination that "the first main processing value Sma is not suitable but the second main processing value Smb is suitable", in the process of step S150, the first target value Tra is calculated based on the first sub-processing value Sfa and the second main processing value Smb. As described above, the suitability determination process of the first main processing value Sma has been described.

<<Phase Difference Compensation of Calculation Cycle>>

The phase difference compensation of the calculation cycle in the first and second controllers ECA and ECB will be described. A phase difference may occur in the calculation cycle due to calculation delay and communication delay between the two controllers ECA and ECB. For example, when the time delay of the signal transmission by the communication bus CMB is large, the second main processing value Smb is read with a lag in time with respect to the first main processing value Sma in the processing by the first controller ECA.

The time delay of the signal transmission through the communication bus CMB is can be predicted in advance. Thus, the present second main processing value Smb is compared with the first main processing value Sma of at least one calculation cycle prior and the suitability of the first main processing value Sma can be determined. For example, the present reception value Smb(n) of the second main processing value is compared with the previous (one calculation cycle prior) read value Sma (n−1) of the first main processing value. Here, the inside of the parentheses represents the calculation cycle, "n" represents the present cycle, and "n−1" represents the previous cycle. First and second main processing values Sma and Smb of different calculation cycles to which the signal transmission delay is taken into consideration are compared. As a result, the time delay of the signal transmission can be compensated.

Furthermore, in step S120, the first and second main processing values Sma, Smb are stored, a comparison based on the stored first main processing value Sma (first storage value Smak) and the stored second main processing value Smb (second storage value Smbk) is performed, and the suitability of the first main processing value Sma can be determined. Here, the first and second main processing values Sma, Smb are stored over at least one or more calculation cycles. For example, an average value in the storage period can be adopted as the first and second storage values Smak and Smbk. Since the first and second storage values Smak and Smbk stored over a plurality of calculation cycles are compared, the influence of the time delay of the signal transmission can be alleviated.

Figure 3:
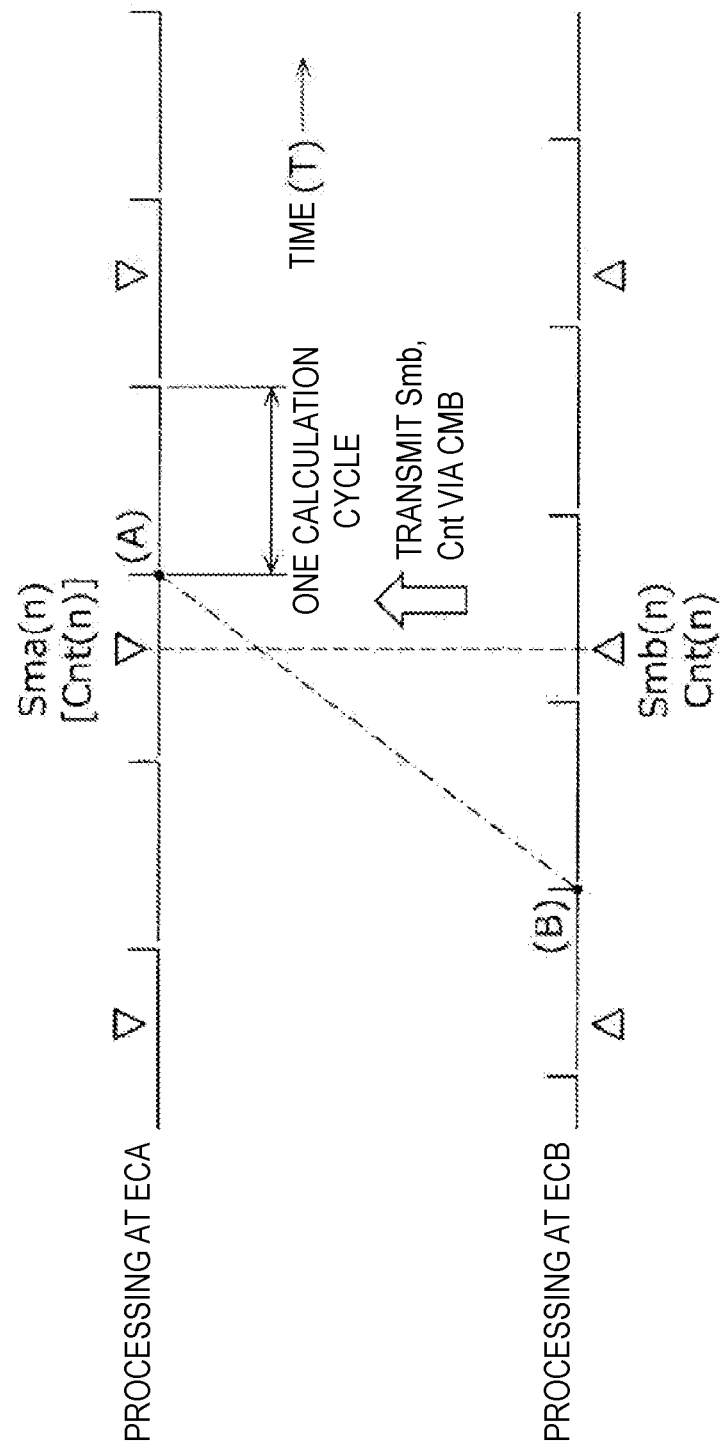
FIG. 3 is a time series chart for explaining phase difference compensation of a calculation cycle by a synchronization signal.

Phase Difference Compensation of Calculation Cycle by Synchronization Signal Cnt The phase difference compensation of the calculation cycle based on the synchronization signal Cnt will be described with reference to the time series diagram of FIG. 3. FIG. 3 shows calculation cycles in the first and second controllers ECA and ECB at the elapse of time T. Time points (A) and (B) are reading at the same timing, and the calculation cycle in the first controller ECA and the calculation cycle in the second controller ECB are not synchronized (that is, phases do not coincide) due to calculation delay and communication delay. Specifically, from the viewpoint of the first controller ECA, that processed by the first controller ECA is temporally advanced, and that processed by the second controller ECB is temporally behind. When the time delay becomes large, a shift worth a plurality of calculation cycles occurs. Therefore, when the first main processing value Sma and the second main processing value Smb are compared at a timing determined within one operation cycle, the signals read at different timings may be compared.

The second controller ECB simultaneously transmits the synchronization signal Cnt to the first controller ECA via the communication bus CMB with the transmission of the second main processing value Smb. The first controller ECA immediately reads the first main processing value Sma at the timing of receiving the synchronization signal Cnt and compares the first main processing value Sma with the second main processing value Smb. The first main processing value Sma and the second main processing value Smb are synchronized by the synchronization signal Cnt and the first main processing value Sma and the second main processing value Smb of the same timing are compared.

The synchronization signal Cnt can be transmitted from the first controller ECA to the second controller ECB. In this case, the second controller ECB immediately transmits the second main processing value Smb at the timing of receiving the synchronization signal Cnt. In the first controller ECA, the reception value Smb is compared with the first main processing value Sma at the time point the synchronization signal Cnt is transmitted. Similar to the above, the time delay of signal transmission is avoided, and the first main processing value Sma and the second main processing value Smb of the same timing are compared.

The transmission of the synchronization signal Cnt is performed every calculation cycle. Furthermore, the synchronization signal Cnt may be transmitted every plurality of calculation cycles. For example, the synchronization signal Cnt is transmitted once in two calculation cycles or once in three calculation cycles, and the first main processing value Sma and the second main processing value Smb are synchronized and compared.

A case where the main and sub-sensors SMN, SFK are connected to the first controller ECA, the main sensor SMN is connected to the second controller ECB, and the suitability of the first main processing value Sma is determined in the first controller ECA has been described with reference to FIGS. 2 and 3. In addition to the first controller ECA, the sub-sensor SFK can also be connected to the second controller ECB. Furthermore, in the first controller ECA, the suitability of the first sub-processing value Sfa can be determined in addition to the first main processing value Sma. Moreover, the suitability of at least one of the second main processing value Smb and the second sub-processing value Sfb can be determined in the second controller ECB. The phase difference compensation of the first and second main processing values Sma and Smb has been described above.

Figure 4:
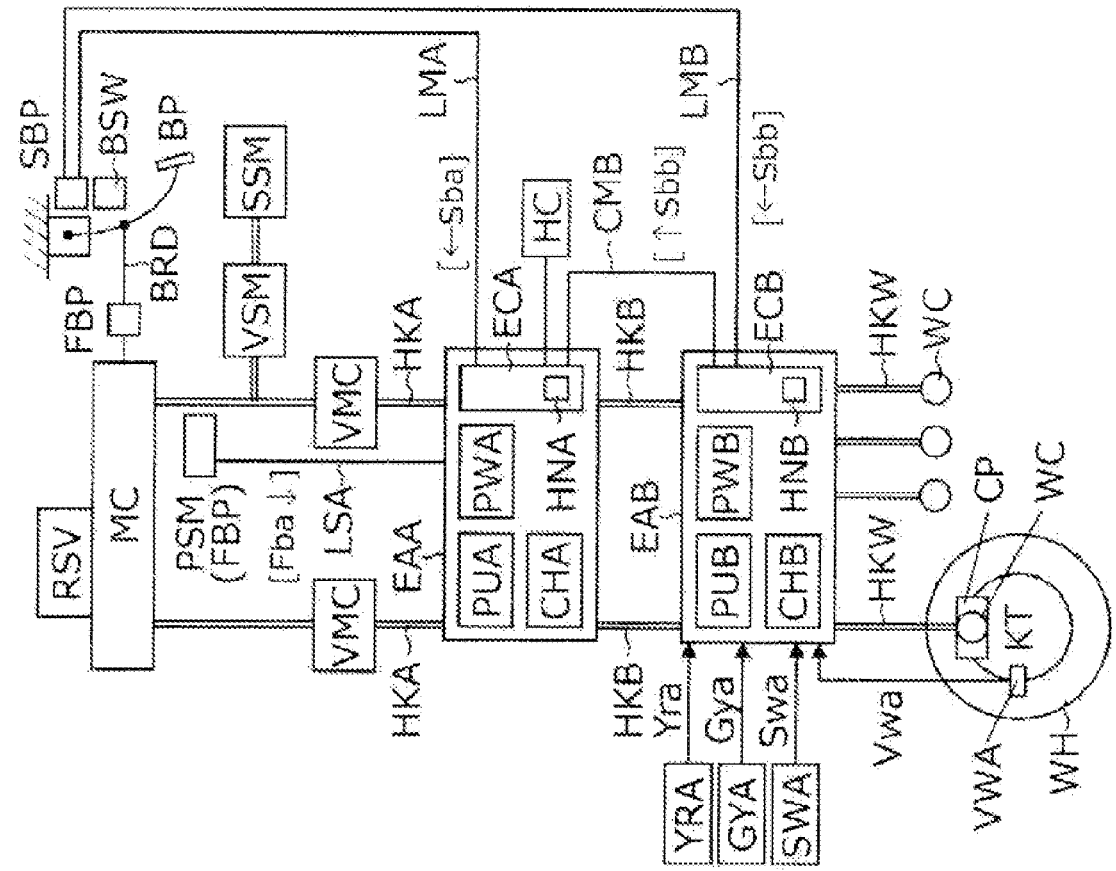
FIG. 4 is an overall configuration diagram for describing a first embodiment of a braking control device for a vehicle provided with the sensor monitoring device according to the present invention.
Figure 5:
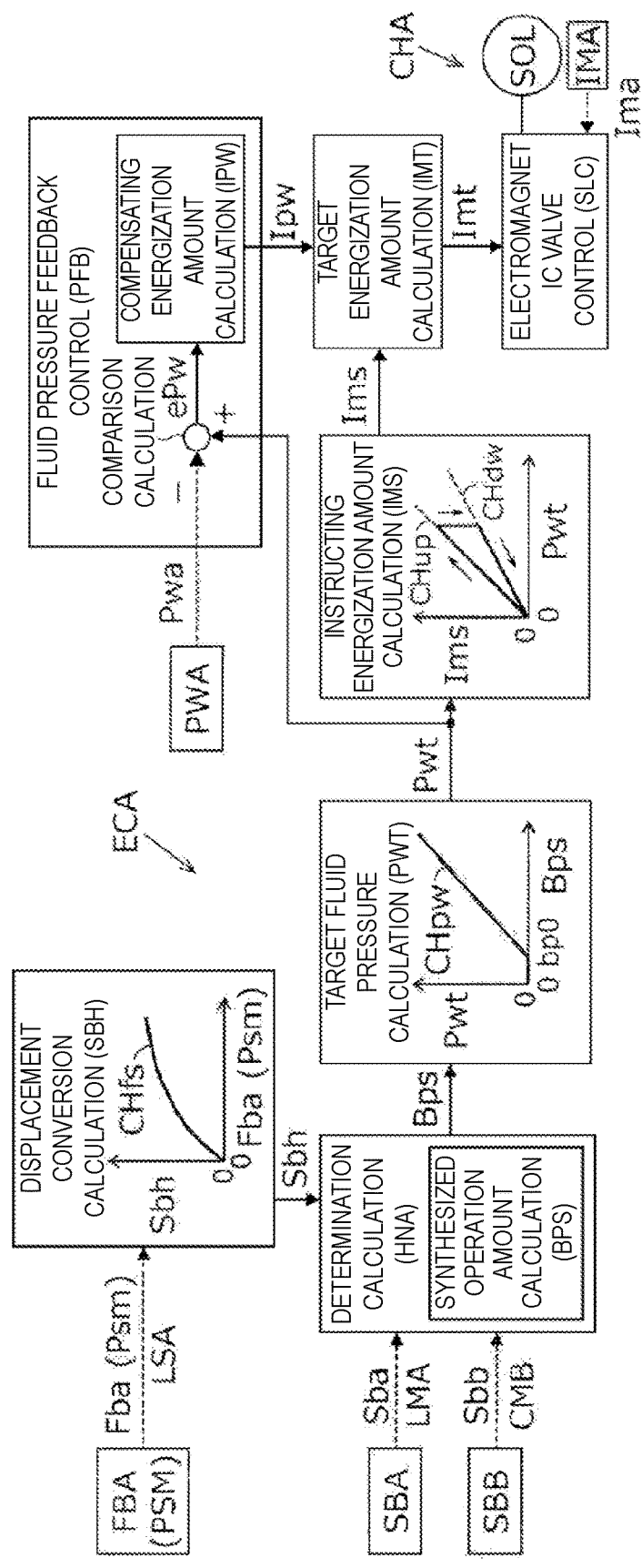
FIG. 5 is a function block diagram for explaining processing in the first controller.

First Embodiment of Braking Control Device for Vehicle Provided with Sensor Monitoring Device SKS A first embodiment of a braking control device for a vehicle provided with the sensor monitoring device SKS will be described with reference to the overall configuration diagram of FIG. 4 and the function block diagram of FIG. 5. In FIGS. 4 and 5, in the sensor monitoring device SKS described with reference to FIGS. 1 to 3, the main sensor SMN is equivalent to the operational displacement sensor SBP, and the auxiliary sensor SFK is equivalent to the operation force sensor FBP. As described above, constituent members denoted by the same symbols, calculation process, signals, characteristics, and values are of the same function.

As shown in FIG. 4, the vehicle is provided with two different fluid pressure units EAA (equivalent to first control device CSA) and EAB (equivalent to second control device CSB). In addition to the first and second fluid pressure units EAA, EAB, the vehicle includes a braking operation member BP, an operational displacement sensor SBP (equivalent to main sensor SMN), an operation force sensor FBP (equivalent to sub-sensor SFK), a master cylinder MC, a stroke simulator SSM, a simulator shutoff valve VSM, a master cylinder shutoff valve VMC, fluid path (brake pipings) HKA, HKB, HKW, and a notifying device HC. Furthermore, each wheel WH of the vehicle is provided with a brake caliper CP, a wheel cylinder WC, a rotating member KT, and a friction member.

The braking operation member (e.g., brake pedal) BP is a member operated by the driver to decelerate the vehicle. The braking torque of the wheel WH is adjusted, and the braking force is generated at the wheel WH by operating the braking operation member BP. Specifically, a rotating member (e.g., brake disc) KT is fixed to the wheel WH of the vehicle. The brake caliper CP is arranged so as to sandwich the rotating member KT. In the brake caliper (also simply referred to as caliper) CP, a wheel cylinder WC is provided. As the pressure of the brake fluid in the wheel cylinder WC is increased, the friction member (e.g., the brake pad) is pressed against the rotating member KT. Since the rotating member KT and the wheel WH are fixed so as to rotate integrally, a braking torque (braking force) is generated at the wheel WH by the frictional force generated at this time. As the caliper CP, a floating type caliper or an opposing type caliper can be adopted.

On the braking operation member BP, the operational displacement sensor SBP (corresponds to main sensor SMN) is provided so as to detect the operational displacement Sbp (corresponds to main detected value Smn). A state variable related to "displacement" of the braking operation member BP is detected as the operational displacement Sbp. In other words, the operational displacement sensor SBP detects the "state quantity related to displacement" as the operational displacement Sbp. For example, in the braking operation member BP rotatably fixed to a vehicle body, a rotation angle of the braking operation member BP with respect to the vehicle body is detected as the operational displacement Sbp. In this case, the operational displacement sensor SBP is a rotation angle sensor. Furthermore, a displacement of a brake rod BRD mechanically connecting the braking operation member BP and a piston in the master cylinder MC with respect to the vehicle body can be detected as the operational displacement Sbp. In this case, the operational displacement sensor SBP is a linear displacement sensor.

Furthermore, the operation force sensor FBP (corresponds to sub-sensor SFK) is provided on the braking operation member BP so as to detect the operation force Fbp (corresponds to the sub-detected value Sfk). A state variable related to "force" of the braking operation member BP is detected as the operation force Fbp. In other words, the operation force sensor FBP detects the "state quantity related to force" as the operation force Fbp. For example, in a case where the braking operation member BP is a brake pedal operated by foot, the pedaling force is detected as the operation force Fbp by a pedaling force sensor FBP. Furthermore, the fluid pressure Psm in a simulator SSM (i.e., in master cylinder MC) can be detected as the operation force Fbp. In this case, the operation force sensor FBP is a pressure sensor PSM.

The operational displacement sensor SBP is connected to the first fluid pressure unit EAA (in particular, first controller ECA) by way of a first displacement signal line LMA. Furthermore, the operational displacement sensor SBP is connected to the second fluid pressure unit EAB (in particular, second controller ECB) by way of a second displacement signal line LMB. Here, the first and second displacement signal lines LMA and LMB are cables (e.g., electric wires) and only the operational displacement Sbp is transmitted, and other signals are not transmitted. The operation force sensor FBP is connected to the first fluid pressure unit EAA (in particular, first controller ECA) by way of a first force signal line LSA. For example, the simulator fluid pressure sensor PSM, which is the operation force sensor FBP, can be incorporated in the first fluid pressure unit EAA. In this case, a pin (sensor pin) is adopted as the first force signal line LSA.

A tandem master cylinder (also simply referred to as master cylinder) MC is connected to the braking operation member BP by way of a piston rod BRD. The operation force (e.g., brake pedal pedaling force) of the braking operation member BP is converted into the pressure of the brake fluid by the master cylinder MC. A fluid path (master cylinder piping) HKA is connected to the master cylinder MC, where when the braking operation member BP is operated, the brake fluid is discharged (pressure-fed) from the master cylinder MC to the fluid path HKA.

A stroke simulator (also simply referred to as a simulator) SSM is provided to cause the braking operation member BP to generate an operation force. A simulator shutoff valve VSM is provided between a fluid pressure chamber in the master cylinder MC and the simulator SSM. The simulator shutoff valve VSM is a two-position electromagnetic valve having an open position and a closed position. When the simulator shutoff valve VSM is at the open position, the master cylinder MC and the simulator SSM are in a communicating state, and when the simulator shutoff valve VSM is at the closed position, the master cylinder MC and the simulator SSM are in a shutoff state non-communicating state). A normally closed electromagnetic valve (NC valve) can be adopted as the simulator shutoff valve VSM.

A piston and an elastic body (e.g., a compression spring) are provided inside the simulator SSM. The brake fluid is moved from the master cylinder MC into the simulator SSM, and the piston is pushed by the flowing brake fluid. A force is imparted to the piston in a direction of inhibiting the inflow of the brake fluid by the elastic body. An operation force (e.g., brake pedal pedaling force) Fbp in the case where the braking operation member BP is operated is formed by the elastic body.

A simulator fluid pressure sensor PSM is provided so as to detect the simulator fluid pressure Psm as the operation force Fbp. Here, the simulator fluid pressure sensor PSM is the operation force sensor FBP. The simulator fluid pressure Psm is input to the first controller ECA of the first fluid pressure unit EAA via the first force signal line LSA (sensor pin).

A master cylinder shutoff valve VMC is provided in a fluid path (master cylinder piping) HKA that connects the master cylinder MC and the wheel cylinder WC. The master cylinder shutoff valve VMC is a two-position electromagnetic valve having an open position and a closed position. The master cylinder MC and the wheel cylinder WC are in a communicating state when the master cylinder shutoff valve VMC is at the open position, and the master cylinder MC and the wheel cylinder WC are in a shutoff state (non-communicating state) when the master cylinder shutoff valve VMC is at the closed position. A normally opened electromagnetic valve (NO valve) can be adopted as the master cylinder shutoff valve VMC.

<<First Fluid Pressure Unit EAA>>

The first fluid pressure unit EAA generates fluid pressure in the wheel cylinder WC provided in the four wheels WH of the vehicle in place of the master cylinder MC. When the first fluid pressure unit EAA is operated, the master cylinder shutoff valve VMC is at the closed position, and movement of the brake fluid from the master cylinder MC to the wheel cylinder WC is inhibited. In this case, the simulator shutoff valve VSM is at the open position, and thus the brake fluid from the master cylinder MC is moved to the simulator SSM. The first fluid pressure unit EAA is a braking control device having a so-called brake-by-wire configuration. The first fluid pressure unit EAA is configured by a first power source PUA, a first pressure regulating mechanism CHA, a first fluid pressure sensor PWA, and a first controller (electronic control unit) ECA.

In the first power source PUA, the pressure of the brake fluid is generated using power other than muscle strength of the driver as a power source. For example, the first power source PUA is a hydraulic pump driven by an electric motor. In this case, the fluid pressure generated by the hydraulic pump can be stored and used in the pressure accumulator. Furthermore, a fluid cylinder (electric cylinder) driven by the electric motor can be adopted as the first power source PUA. Specifically, the rotational power of the electric motor is converted into a linear power by a power conversion mechanism (e.g., a screw mechanism), whereby the piston in the electric cylinder is pressed, and pressure is generated in the brake fluid.

The fluid pressure generated by the first power source PUA is controlled to a desired fluid pressure by the first pressure regulating mechanism CHA. The first pressure regulating mechanism CHA is controlled by the first controller ECA. For example, the first pressure regulating mechanism CHA is configured by a linear electromagnetic valve. Specifically, the high pressure stored in the pressure accumulator is regulated by the linear electromagnetic valve, and is output from the first pressure regulating mechanism CHA. In the case where the electric cylinder is adopted as the first power source PUA, the first power source PUA functions as the first pressure regulating mechanism CHA. Specifically, fluid pressure control is performed by adjusting the output of the electric motor of the electric cylinder. Therefore, the electric cylinder operates as the first power source PUA and the first pressure regulating mechanism CHA. The first fluid pressure unit EAA (i.e., first pressure regulating mechanism CHA) is fluidly connected to the second fluid pressure unit EAB by way of a fluid path HKB.

The pressure regulation result Pwa of the first pressure regulating mechanism CHA is detected by the first fluid pressure sensor PWA. That is, the first fluid pressure sensor PWA detects the output fluid pressure Pwa of the first fluid pressure unit EAA (in particular, first pressure regulating mechanism CHA). The output fluid pressure Pwa is input to the first controller ECA as the actual brake fluid pressure Pwa.

The first power source PUA and the first pressure regulating mechanism CHA are controlled by the first controller (electronic control unit) ECA. In the first controller ECA, signals for controlling the electromagnetic valves VSM, VMC are calculated and output. The first controller ECA is configured by a control algorithm programmed in the microprocessor and an electric circuit (drive circuit) that drives the electric motor and the electromagnetic valve according to the algorithm. Furthermore, the first controller ECA is connected to the second controller ECB of the second fluid pressure unit EAB through a communication bus CMB (e.g., serial communication bus) in a state where signal transmission with the second controller ECB can be carried out. For example, controller area network (CAN) may be adopted as the communication bus CMB.

—Calculation Process by the First Controller ECA—

The calculation process by the first controller ECA and the like will be described with reference to the function block diagram of FIG. 5. The processing described below is a calculation algorithm, and is programmed in the microcomputer of the first controller ECA.

In the displacement conversion calculation block SBH of the first controller ECA, the operation force Fbp (e.g., simulator fluid pressure Psm) acquired via the first force signal line LSA is read as the first force processing value Fba. In the displacement conversion calculation block SBH, the displacement conversion value Sbh (corresponds to conversion value Smh) is calculated based on the first force processing value Fba and the conversion characteristic CHfs. The rigidity (e.g., spring constant of internal elastic body) of the simulator SSM is known. Therefore, the first force processing value Fba, which is a "state variable related to force", can be converted into "state variable related to displacement" based on the rigidity of the simulator SSM. Therefore, the first force processing value Fba is converted into the displacement conversion value Sbh based on the conversion characteristic (calculation map) CHfs. Here, the displacement characteristic CHfs is set in advance so that the displacement conversion value Sbh monotonically increases in an "upwardly convex" shape from "0" as the first force processing value Fba increases from "0". The rigidity of the simulator SSM is set so as to correspond to the rigidity (spring constant) of each fluid path HKA, HKB, HKW, the rigidity of the caliper CP, the rigidity of the friction member, and the like.

The operational displacement Sbp obtained via the first displacement signal line LMA is read as the first displacement processing value Sba by the first determination processing block HNA (equivalent to sensor monitoring device SKS, equivalent to determining means). Furthermore, the second displacement processing value Sbb obtained via the communication bus CMB is read in the determination processing block HNA. Furthermore, the displacement conversion value Sbh is input to the determination processing block HNA from the displacement conversion calculation block SBH. In the determination processing block HNA, "whether or not the first displacement processing value Sba is suitable" is determined based on the first displacement processing value Sba, the second displacement processing value Sbb, and the displacement conversion value Sbh. In addition, the synthesized operation amount Bps is calculated based on the first and second displacement processing values Sba, Sbb and the displacement conversion value Sbh. Details of the suitability determination of the first displacement processing value Sba in the determination processing block HNA will be described later.

When the first displacement processing value Sba is suitable, the synthesized operation amount calculation block BPS in the first determination processing block HNA calculates the synthesized operation amount Bps based on the first displacement processing value Sba and the displacement conversion value Sbh. Specifically, the synthesized operation amount Bps is calculated by equation (1).

$$Bps = Ksb \times Sba + (1-Ksb) \times Sbh \quad \text{Equation (1)}$$

Here, the contribution coefficient Ksb is a coefficient of greater than or equal to "0" and smaller than or equal to "1", and decreases as the first displacement processing value Sba (or first force processing value Fba) increases. Therefore, when the first displacement processing value Sba is relatively small, the contribution degree of the first displacement processing value Sba in the synthesized operation amount Bps is made relatively large. The contribution degree of the first displacement processing value Sba decreases as the first displacement processing value Sba increases. When the first displacement processing value Sba becomes relatively large, the contribution degree of the first force processing value Fba in the synthesized operation amount Bps is made relatively large.

On the other hand, when the first displacement processing value Sba is non-suitable, the second displacement processing value Sbb is adopted instead of the first displacement processing value Sba, and the synthesized operation amount Bps is calculated based on the second displacement processing value Sbb and the displacement conversion value Sbh. Specifically, the synthesized operation amount Bps is calculated by equation (2) using the contribution coefficient Ksb.

$$Bps = Ksb \times Sbb + (1-Ksb) \times Sbh \quad \text{Equation (2)}$$

In the target fluid pressure calculating block PWT of the first controller ECA, the target fluid pressure Pwt (corresponds to first target value Tra) is calculated based on the synthesized operation amount Bps and the calculation characteristic CHpw. The target fluid pressure Pwt is a target value of the output fluid pressure of the first fluid pressure unit EAA. Here, the calculation characteristic CHpw is a calculation map set in advance for determining the target fluid pressure Pwt.

In the calculation characteristic CHpw, the target fluid pressure Pwt is determined to be "0" when the synthesized operation amount Bps is greater than or equal to "0" and smaller than the predetermined value bpo, and target fluid pressure Pwt is calculated so as to monotonically increase with increase in the synthesized operation amount Bps when the synthesized operation amount Bps is greater than or equal to the predetermined value bpo. Here, the predetermined value bpo is a value equivalent to the play of the braking operation member BP.

The first controller ECA outputs a drive signal for setting the simulator shutoff valve VSM to the open position and outputs a drive signal for setting the master cylinder shutoff valve VMC to the closed position when the synthesized operation amount Bps becomes greater than or equal to the predetermined value bpo. With these signals, the master cylinder MC is brought into communication with the simulator SSM, and the first fluid pressure unit EAA is brought into communication with the wheel cylinder WC.

The first power source PUA and the electric motor (for driving hydraulic pump or for electric cylinder) constituting the first pressure regulating mechanism CHA, and the linear electromagnetic valve are controlled based on the fluid pressure target value Pwt calculated by the first controller ECA.

For example, in the case where the linear electromagnetic valve SOL is adopted as the first pressure regulating mechanism CHA, an instructing energization amount Ims of the linear electromagnetic valve SOL is determined based on the target fluid pressure Pwt by an instructing energization amount calculating block IMS. Furthermore, in a fluid pressure feedback control block PFB, the fluid pressure feedback control is executed based on the actual fluid pressure (detected value) Pwa. A fluid pressure deviation ePw between the target value Pwt of the brake fluid pressure and the detected value Pwa is calculated, and based on this deviation ePw, a compensating energization amount Ipw is calculated by a compensating energization amount calculating block IPW.

In the target energization amount calculating block IMT, the target energization amount Imt is determined by the instructing energization amount Ims and the compensating energization amount Ipw. In the target energization amount calculating block IMT, the instructing energization amount Ims is finely adjusted by the compensating energization amount Ipw so that the actual value Pwa of the wheel cylinder fluid pressure Pwc matches the target value Pwt by the PID control based on the fluid pressure deviation ePw. In the electromagnetic valve control block SLC, the linear electromagnetic valve SOL is controlled based on the target energization amount Imt. The drive circuit of the linear electromagnetic valve SOL is provided with an energization amount sensor IMA, and an actual energization amount Ima (e.g., a current value) is detected. Then, the current feedback control is executed so that the actual energization amount Ima matches the target energization amount Imt. Highly accurate fluid pressure control by the linear electromagnetic valve SOL can be executed by the fluid pressure feedback control and the current feedback control. The first fluid pressure unit EAA has been described above.

<<Second Fluid Pressure Unit EAB>>

Returning to the overall configuration diagram of FIG. 4, the second fluid pressure unit EAB will be described. In the vehicle, a second fluid pressure unit EAB is provided separately from the first fluid pressure unit EAA. That is, two fluid pressure units EAA, EAB are provided in the vehicle. The second fluid pressure unit EAB is provided in a fluid path between the first fluid pressure unit EAA and the wheel cylinder WC. A fluid path HKB between the first fluid pressure unit EAA and the second fluid pressure unit EAB is a pressure regulating piping, and a fluid path HKW between the second fluid pressure unit EAB and the wheel cylinder WC is a wheel cylinder piping. That is, the first fluid pressure unit EAA and the second fluid pressure unit EAB are arranged in series with respect to the wheel cylinder WC.

The second fluid pressure unit EAB regulates the fluid pressure Pwc of the wheel cylinder WC of each wheel WH independently of the driver's braking operation based on the turning state of the vehicle. Accordingly, the fluid pressure (i.e., output fluid pressure Pwa) generated by the first fluid pressure unit EAA is regulated by the second fluid pressure unit EAB, and the final wheel cylinder fluid pressure Pwc is generated. The second fluid pressure unit EAB is a so-called fluid pressure unit for electronic stability control (ESC).

Similar to the first fluid pressure unit EAA, the second fluid pressure unit EAB is configured by a second power source PUB, a second pressure regulating mechanism CHB, a second fluid pressure sensor PWB, and a second controller (electronic control unit) ECB. The pressure of the brake fluid is generated by the second power source PUB that is separate from the first power source PUA. For example, the second power source PUB is a hydraulic pump driven by an electric motor.

The fluid pressure generated by the second power source PUB is controlled to a desired fluid pressure by the second pressure regulating mechanism CHB. The second power source PUB, and the second pressure regulating mechanism CHB are controlled by the second controller ECB. For example, the second pressure regulating mechanism CHB is configured by a linear electromagnetic valve. The fluid pressure is increased by the hydraulic pump driven by the electric motor, and the fluid pressure is regulated by a differential pressure valve (electromagnetic valve). Furthermore, the fluid pressure Pwc in the wheel cylinder WC of each wheel WH is independently regulated by a combination of a pressure increasing electromagnetic valve and a pressure reducing electromagnetic valve.

Similar to the first controller ECA, the second controller ECB of the second fluid pressure unit EAB includes a control algorithm programmed in the microprocessor, an electric circuit (drive circuit) for driving the electric motor and the electromagnetic valve according to the algorithm.

The second controller ECB receives a yaw rate Yra from a yaw rate sensor YRA, a lateral acceleration Gya from a lateral acceleration sensor GYA, a steering angle Swa from an operation angle sensor SWA, and a wheel speed Vwa from a wheel speed sensor VWA. To execute vehicle stability control (control to suppress excessive understeer and oversteer based on yaw rate Yra etc.), anti-skid control (control to suppress wheel lock based on wheel speed Vwa etc.), and the like based on the signals (Yra, Vwa, etc.), the target value Pwt of the brake fluid pressure (fluid pressure in wheel cylinder WC) is calculated in each wheel WH. Then, the wheel cylinder fluid pressure Pwc is regulated so that the target value Pwt is achieved.

In the second fluid pressure unit EAB, in addition to executing the vehicle stability control and the like, the fluid pressure adjustment of the wheel cylinder WC can be executed according to the operational displacement Sbp (i.e., second displacement processing value Sbb) of the braking operation member BP when the first fluid pressure unit EAA is in a malfunction state. The second fluid pressure unit EAB is provided with the second power source PUB and the second pressure regulating mechanism CHB different from the first fluid pressure unit EAA.

The operational displacement Sbp is input to the second controller ECB via the second displacement signal line LMB and is read as the second displacement processing value Sbb. In addition, the second displacement processing value Sbb is transmitted from the second controller ECB to the first controller ECA via the communication bus CMB (e.g., serial communication bus). In the case where the first fluid pressure unit EAA is malfunctioning, the second fluid pressure unit EAB increases the fluid pressure Pwc of the wheel cylinder WC in place pf the first fluid pressure unit EAA based on the second displacement processing value Sbb. At this time, the operation of the first fluid pressure unit EAA is stopped.

Similar to the first determination processing block HNA (equivalent to determining means) of the first controller ECA, the second determination processing block HNB (equivalent to determining means) can be formed in the second controller ECB. The suitability of the second displacement processing value Sbb is determined by a method similar to the first determining means HNA. The second fluid pressure unit EAB has been described above.

From the second fluid pressure unit EAB (in particular, first pressure regulating mechanism CHA), the discharge and inflow of the brake fluid regulated with each wheel cylinder WC are carried out through the fluid path (wheel cylinder piping) HKW. The piston in the wheel cylinder WC moves (forward or backward) with respect to the rotating member KT, and the braking force of the wheel WH is regulated (increased, or decreased) by regulating the fluid pressure Pwc in the wheel cylinder WC of the caliper CP.

The vehicle is provided with a notifying device HC. When the first displacement processing value Sba or the like is in a non-suitable state, this is notified to the driver by the notifying device HC. For example, the notifying device HC notifies the driver of the non-suitable state by sound, light, or the like.

Suitability Determination Process of First Displacement Processing Value Sba

Figure 6:
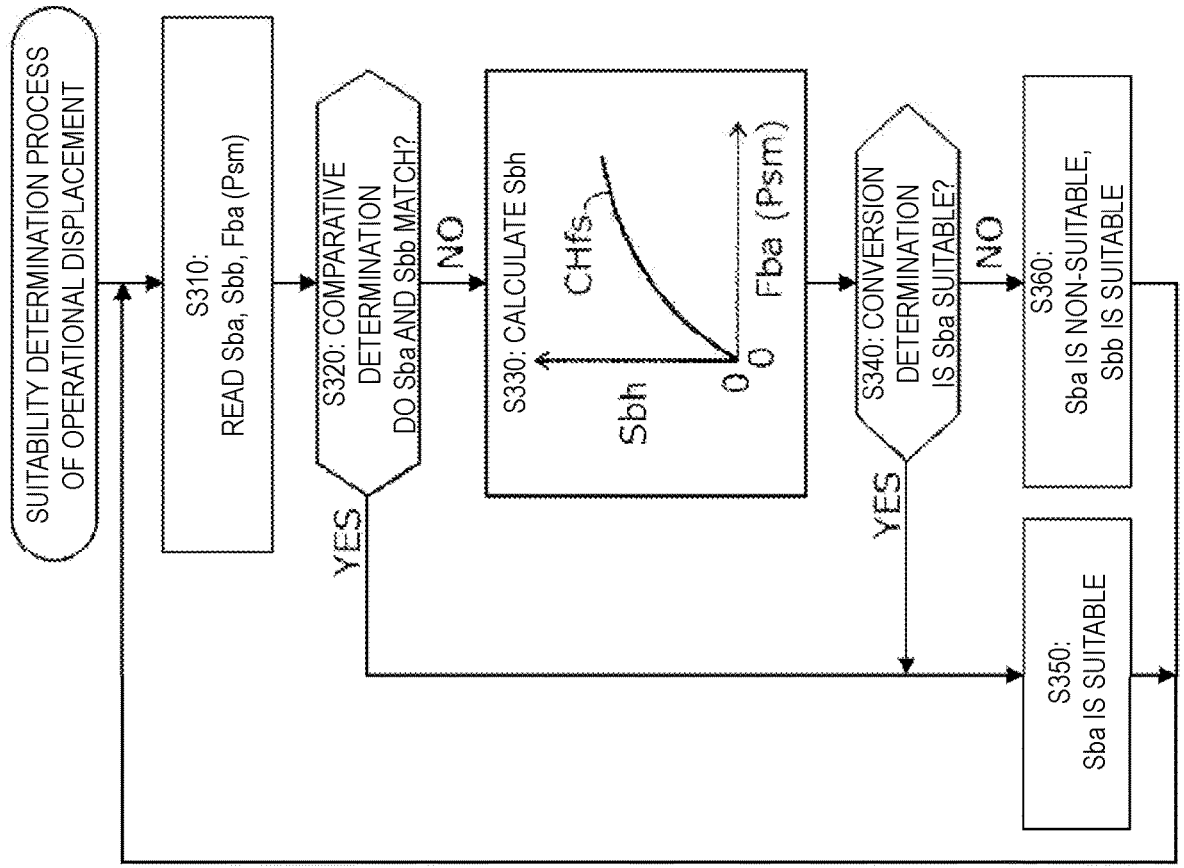
FIG. 6 is a flowchart for explaining a suitability determination process of an operational displacement.

The suitability determination process of the first displacement processing value Sba in the first controller ECA will be described with reference to the flowchart of FIG. 6. In step S310, the first and second displacement processing values Sba, Sbb and the first force processing value Fba (e.g., simulator fluid pressure Psm) are read. Here, the first displacement processing value Sba is that in which the operational displacement Sbp detected by the operational displacement sensor SBP is acquired by the first controller ECA via the first displacement signal line LMA. The second displacement processing value Sbb is that in which the operational displacement Sbp detected by the operational displacement sensor SBP is read by the second controller ECB via the second displacement signal line LMB and is acquired by the first controller ECA via the communication bus (serial communication bus) CMB. The first force processing value Fba is that in which the operation force Fbp detected by the operation force sensor FBP is acquired by the first controller ECA via the first force signal line LSA. In the first and second displacement processing values Sba, Sbb, the influence of the time delay of the signal transmission in the communication bus CMB is compensated based on the method described with reference to FIGS. 2 and 3 (selection and adjustment of the comparing calculation cycle, signal storage over plural cycles, transmission of synchronization signal Cnt).

In step S320, "whether or not the first displacement processing value Sba and the second displacement processing value Sbb match" is determined (corresponds to "comparative determination"). When "Sba≈Sbb (substantially matching)" and the result in step S320 is affirmative ("YES"), the process proceeds to step S350. The suitable states of the first and second displacement processing values Sba, Sbb are determined by "Sba≈Sbb". On the other hand, when "Sba≠Sbb" and the result in step S320 sis negative ("NO"), the process proceeds to step S330. Determination is made that either one of the first displacement processing value Sba or the second displacement processing value Sbb is non-suitable by "Sba≠Sbb".

In step S330, the first force processing value Fba is converted based on the displacement characteristic CHfs (corresponds to "conversion relationship"), and the displacement conversion value Sbh (corresponds to "conversion value Smh") is calculated. The displacement characteristic CHfs is set in advance based on the rigidity (spring constant of compression spring, etc.) of the simulator SSM. In the displacement characteristic CHfs, the displacement conversion value Sbh is determined with the characteristic of being "convex upward" with respect to the increase of the first force processing value Fba.

In step S340, "whether or not the first displacement processing value Sba is suitable" is determined. Specifically, the first and second displacement processing values Sba, Sbb are compared with the displacement conversion value Sbh (corresponds to "conversion determination"). Then, among the first displacement processing value Sba and the second displacement processing value Sbb, a value closer to the displacement conversion value Sbh is determined to be suitable, and a value deviated from the displacement conversion value Sbh is determined as non-suitable.

When the result in step S340 is affirmative ("YES"), the process proceeds to step S350. When the result in step S340 is negative ("NO"), the process proceeds to step S360. In step S350, determination is made that "the first displacement processing value Sba is suitable". Furthermore, in step S360, determination is made that "the first displacement processing value Sba is non-suitable, but the second displacement processing value Sbb is suitable".

When the process of step S350 is executed, the first displacement processing value Sba and the first force processing value Fba are adopted in the calculation process (see FIG. 5) in the synthesized operation amount calculation block BPS (see equation (1)). When the process of step S360 is executed, the second displacement processing value Sbb and the first force processing value Fba are adopted in the synthesized operation amount calculation block BPS (refer to equation (2)). Since the signals Sba and Sbb for calculating the synthesized operation amount Bsp are mutually monitored by the first and second controllers ECA and ECB, redundancy of the operation of the device can be secured with a simplified device configuration. Furthermore, reliability of the operational displacement Sbp can be improved by the conversion determination based on the first force processing value Fba.

In the suitability determination process, the process related to the conversion determination can be omitted. When the comparative determination is affirmed and the suitable state of the first displacement processing value Sba is determined, equation (1) is adopted in the synthesized operation amount calculation block BPS. On the other hand, when the comparative determination is denied, the synthesized operation amount Bps is calculated based only on the first force processing value Fba. For example, it is calculated as "Bps=Sbh". This is because the reliability of the first displacement processing value Sba is low when "Sba≠Sbb". Even with this configuration, the reliability can be secured by mutual monitoring while simplifying the device.

Figure 7:
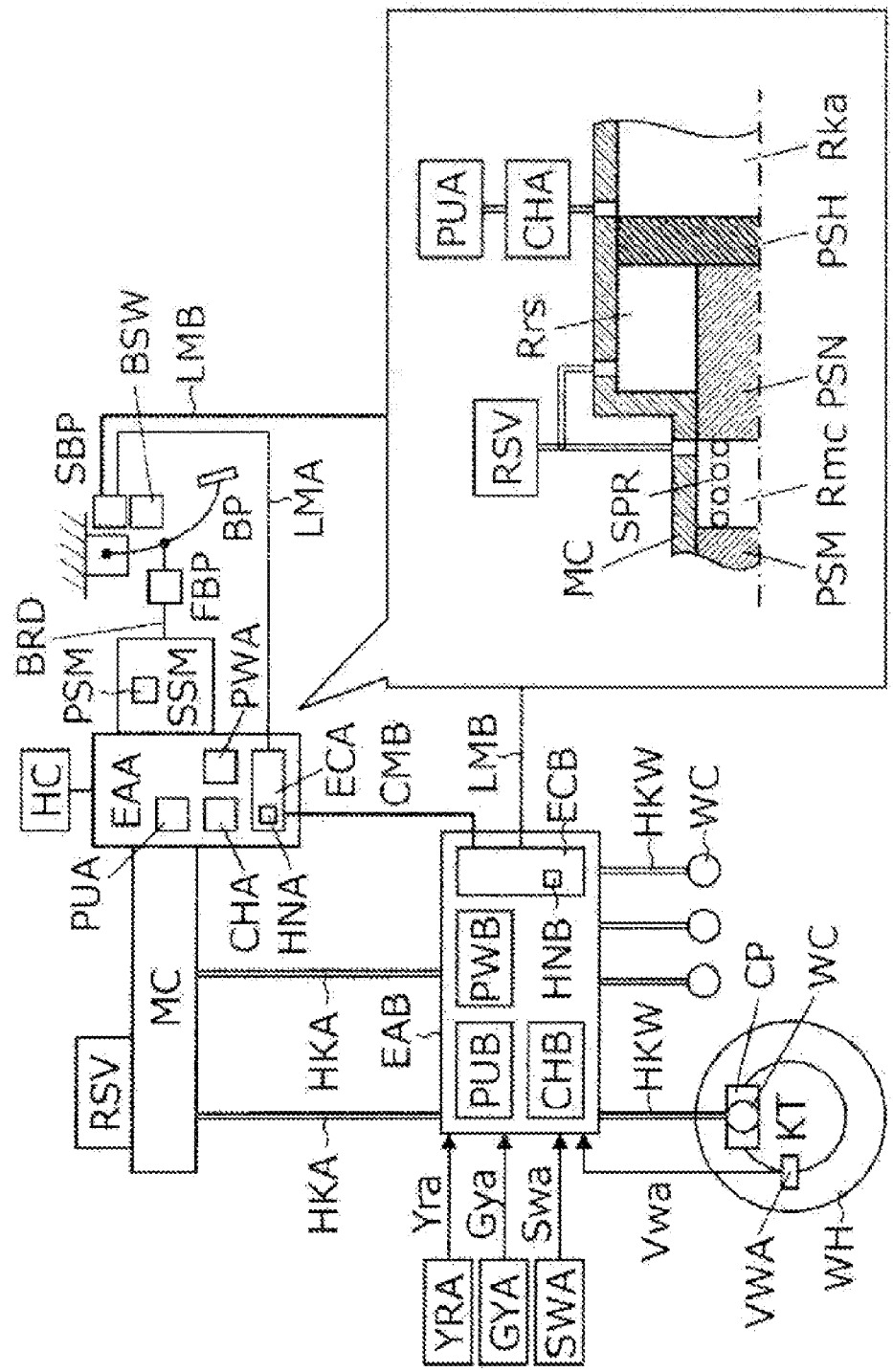
FIG. 7 is an overall configuration diagram for describing a second embodiment of a braking control device for a vehicle provided with the sensor monitoring device according to the present invention.

Second Embodiment of Braking Control Device for Vehicle Provided with Sensor Monitoring Device SKS A second embodiment of the braking control device for the vehicle according to the present invention will be described with reference to an overall configuration diagram of FIG. 7. In the first embodiment, the wheel cylinder WC is selectively pressurized (so-called brake-by-wire configuration) by one of the first fluid pressure unit EAA and the master cylinder MC. In the second embodiment, the first fluid pressure unit EAA is provided between the master cylinder MC and the braking operation member BP, and the pressurization of the wheel cylinder WC is always performed through the master cylinder MC. As described above, since members having the same symbols, calculation process, signals, characteristics, values, and the like are the same, the difference from the first embodiment will be mainly described.

The first fluid pressure unit EAA is provided between the master cylinder MC and the braking operation member BP. As shown in the cross-sectional view of the balloon portion, the master cylinder MC is of a tandem type, and two master cylinder chambers Rmc partitioned by first and second master pistons PSN, PSM and the inner wall of the master cylinder MC are formed. A compression spring SPR is provided between the first master piston PSN and the second master piston PSM. The master cylinder chamber Rmc is fluidly connected to the second fluid pressure unit EAB through a fluid path HKA. When the first and second master pistons PSN and PSM are moved in the forward direction (to the left in the figure), the volume of the master cylinder chamber Rmc is reduced and the brake fluid is pressure fed from the master cylinder MC toward the wheel cylinder WC. The fluid pressure Pwc of the wheel cylinder WC thereby rises. Conversely, when the master pistons PSN, PSM are moved in the backward direction (to the right in the figure), the volume of the master cylinder chamber Rmc is increased and the brake fluid is absorbed from the wheel cylinder WC to the master cylinder MC. The fluid pressure Pwc of the wheel cylinder WC thereby decreases.

The first fluid pressure unit EAA is provided with a pressurizing piston PSH so as to press the first master piston PSN in the master cylinder MC. A pressurizing chamber Rka is formed by the inner wall of the first fluid pressure unit EAA and the pressurizing piston PSH. Furthermore, a reservoir chamber Rrs is formed by the inner wall of the first fluid pressure unit EAA, the master piston PSN, and the pressurizing piston PSH. The reservoir chamber Rrs is connected to the reservoir RSV and the internal pressure is set at atmospheric pressure. The first pressure regulating mechanism CHA is fluidly connected to the pressurizing chamber Rka. The fluid pressure generated by the first power source PUA is regulated by the first pressure regulating mechanism CHA and supplied to the pressurizing chamber Rka.

When the fluid pressure in the pressurizing chamber Rka is increased, the pressurizing piston PSH presses the master piston PSN in the forward direction. As a result, the first and second master pistons PSN and PSM are moved in the forward direction, and the fluid pressure Pwc of the wheel cylinder WC is increased. On the other hand, when the fluid pressure in the pressurizing chamber Rka is decreased, the force for pressing the master piston PSN in the forward direction by the pressurizing piston PSH is decreased. As a result, the first and second master pistons PSN and PSM are moved in the backward direction by the return spring SPR or the like, and the fluid pressure Pwc of the wheel cylinder WC is decreased.

Similar to the first embodiment, the simulator SSM may be provided. In this case, the braking control device is of a brake-by-wire type, and the operation force Fbp of the braking operation member BP is generated by the simulator SSM.

Furthermore, a configuration in which the simulator SSM is omitted may be adopted. In the configuration without the simulator SSM, the operation force Fbp of the braking operation member BP is generated through the master cylinder MC. Here, the first fluid pressure unit EAA functions as a booster device (brake booster). In this case, the conversion characteristic CHfs is set based on the rigidity (i.e., spring constant) of each fluid path HKA, HKW, the rigidity of the caliper CP, the rigidity of the friction member, and the like.

In the second embodiment as well, comparison determination is executed based on a comparison between the first displacement processing value Sba and the second displacement processing value Sbb, similar to the first embodiment. Furthermore, the first force processing value Fba is converted to the displacement conversion value Sbh, and the conversion determination is performed. Then, when determined that "the first displacement processing value Sba is non-suitable", the target value Imt is calculated based on either one of "only the first force processing value Fba" or "the second displacement processing value Sbb and the first force processing value Fba", and the fluid pressure Pwc of the wheel cylinder WC is controlled based on the target value Imt. Furthermore, in the second embodiment as well, the effects (simplification of configuration and securing of reliability) similar to the first embodiment are achieved.

The invention claimed is:

1. A braking control device for a vehicle that regulates a brake fluid pressure of a wheel cylinder according to an operation of a braking operation member of the vehicle to produce a brake force at a wheel, the braking control device for the vehicle comprising:
   an operational displacement sensor that detects an operational displacement sensor value indicative of operational displacement of the braking operation member;
   a first fluid pressure unit that reads the operational displacement sensor value as a first displacement processing value via a first displacement signal line and regulates the brake fluid pressure based on the first displacement processing value;
   a second fluid pressure unit that reads the operational displacement sensor value as a second displacement processing value via a second displacement signal line and regulates the brake fluid pressure based on the second displacement processing value;
   a communication bus that transmits signals between the first fluid pressure unit and the second fluid pressure unit; and
   a determining means that determines suitability of the first displacement processing value based on the first displacement processing value and the second displacement processing value; wherein
   the first fluid pressure unit
   regulates the brake fluid pressure based on the first displacement processing value when the determining means determines that the first displacement processing value is in a suitable state, and
   regulates the brake fluid pressure based on the second displacement processing value when the determining means determines that the first displacement processing value is in a non-suitable state.

2. A braking control device for a vehicle that regulates a brake fluid pressure of a wheel cylinder according to an operation of a braking operation member of the vehicle to produce a brake force at a wheel, the braking control device for the vehicle comprising:
   an operational displacement sensor that detects an operational displacement sensor value indicative of operational displacement of the braking operation member;
   a first fluid pressure unit that reads the operational displacement sensor value as a first displacement processing value via a first displacement signal line and regulates the brake fluid pressure based on the first displacement processing value;
   a second fluid pressure unit that reads the operational displacement sensor value as a second displacement processing value via a second displacement signal line and regulates the brake fluid pressure based on the second displacement processing value;
   a communication bus that transmits signals between the first fluid pressure unit and the second fluid pressure unit; and
   a determining means that determines suitability of the first displacement processing value based on the first displacement processing value and the second displacement processing value; wherein
   the first fluid pressure unit
   includes an operation force sensor that detects an operation force of the braking operation member;
   reads the operation force as a first force processing value;
   regulates the brake fluid pressure based on the first displacement processing value and the first force processing value when the determining means determines that the first displacement processing value is in a suitable state, and
   regulates the brake fluid pressure based only on the first force processing value when the determining means determines that the first displacement processing value is in a non-suitable state.

3. The braking control device of claim 1, wherein the second fluid pressure unit is provided between the first fluid pressure unit and the wheel cylinder and is configured to perform vehicle stability control.

4. The braking control device of claim 2, wherein the second fluid pressure unit is provided between the first fluid pressure unit and the wheel cylinder and is configured to perform vehicle stability control.

* * * * *